US006990441B1

(12) United States Patent
Bolme et al.

(10) Patent No.: US 6,990,441 B1
(45) Date of Patent: Jan. 24, 2006

(54) NATURAL LANGUAGE MESSAGES FROM A KEYSTROKE OUTPUT WEDGE

(76) Inventors: Paul A. Bolme, 10307 Meridian Ave., Everett, WA (US) 98208; Mark Bolme, 7811 234th St. SW., Edmonds, WA (US) 98026

( * ) Notice: Subject to any disclaimer, the term of this patent is extended or adjusted under 35 U.S.C. 154(b) by 888 days.

(21) Appl. No.: 09/677,293

(22) Filed: Oct. 2, 2000

(51) Int. Cl.
*G10L 21/00* (2006.01)

(52) U.S. Cl. ............................................. 704/8; 704/9

(58) Field of Classification Search .................... 709/8, 709/270, 275; 705/1; 701/201; 704/8, 9, 704/10; 235/462.15, 462.25
See application file for complete search history.

(56) References Cited

U.S. PATENT DOCUMENTS

| | | | |
|---|---|---|---|
| 4,689,737 A | * | 8/1987 | Grant .............................. 704/8 |
| 5,295,064 A | * | 3/1994 | Malec et al. .................... 705/1 |
| 5,905,248 A | * | 5/1999 | Russell et al. ......... 235/462.15 |
| 5,948,040 A | * | 9/1999 | DeLorme et al. ............ 701/201 |
| 6,215,992 B1 | * | 4/2001 | Howell et al. ............ 455/412.1 |
| 6,640,145 B2 | * | 10/2003 | Hoffberg et al. ............... 700/83 |
| 6,732,933 B2 | * | 5/2004 | Waxelbaum ........... 235/462.25 |

OTHER PUBLICATIONS

Roger C. Palmer; The Bar Code Book; Reading, Printing, and Specification of Bar Code Symbols; Helmers Publishing, Inc.; 1989; pp. 83-85.

* cited by examiner

*Primary Examiner*—Susan McFadden
(74) *Attorney, Agent, or Firm*—Graybeal Jackson Haley LLP

(57) ABSTRACT

Provided is a keystroke output wedge, implemented in software or firmware, that presents natural language messages to a user. The messages may be in text form on a display or transmitted in audible form to a wireless headset for example. The wedge provides data translation functions for devices used to collect and input data into a computer such as a bar code scanner. It can also provide messages to the user of the data input device relating to the state of associated application programs and computer operating systems. The wedge can be programmed to provide prompts, such as "SCAN PART NUMBER," or feedback, such as "VALID SCAN."

25 Claims, 3 Drawing Sheets

NATURAL LANGUAGE MESSAGES FROM A KEYSTROKE OUTPUT WEDGE

TECHNICAL FIELD

The invention relates generally to a computer system with a software wedge for data entry of bar code symbols into a computer software application designed for keyboard input, and more particularly to a method and computer system that provides natural language messages from a software wedge to a bar code scanner user.

BACKGROUND

Bar code scanners are used extensively in commercial applications such as scanning grocery items at a supermarket, or tracking parts in a warehouse environment. The scanners are typically a stationary unit, like the type at a supermarket checkout counter, a scanner tethered to a computer by a cable, or a handheld unit that a user can walk around with and scan items where they are stored (on a warehouse shelf for instance). The data from the scanned bar code is usually transmitted by wired or wireless mediums to an application program running on a local computer.

Many scanning systems, which include a scanner, a computer and software running on the computer for receiving the scanned information, provide the user some form of audible or visual feedback. Depending on the sophistication of the scanning system, the messages conveyed by such feedback range from a simple confirmation that a particular scan was error free to messages providing a user with detailed system status messages and prompts for scanning activity by the user.

Many business operations, such as shipping and receiving operations for example, demand an efficient and accurate method of capturing data relating to those operations. Instead of supplying the required data by entering keystrokes, which is a slow method and susceptible to human error, a bar code scanner is often used to scan a label containing the required information in an encoded format. However, many computer software applications for such operations are designed to accept only keyboard input. To enable entry of bar code data into data fields for such a keyboard-based application program, a device called a "wedge" is used. Typically the wedge is a hardware device incorporating bar code scanning equipment, and placed between the keyboard and the keyboard input port on a terminal or computer. The function of the wedge is to translate or convert the bar code data into keystroke data, because that is what is expected by standard keyboard-based applications. In other words, the hardware wedge emulates keystrokes.

Some fully-integrated scanning systems, which include expensive custom, non-standard software applications, are designed to receive scanner input without using a hardware wedge. Such systems typically provide users with more extensive feedback than merely indicating that a scan was successful or the scanner is ready for a new scan like some traditional hardware wedges. These systems traditionally have displays for presenting a user with prompts and other kinds of feedback. However, such systems will not work with standard keyboard-based applications, which require a wedge, and hardware wedges themselves do not have the capability to generate sophisticated messages to the user because the keyboard ports that hardware wedges connect to are uni-directional. In other words, a traditional hardware wedge passes data in only one direction; from the port or scanner to the keystroke input buffer. Therefore, hardware wedges are not able to interact with a keyboard-based application to transmit messages to the user. Also, the form of message conveyed to a user from a hardware wedge is typically limited to a simple pattern of tones and/or flashing lights.

Accordingly, there is a need for a keystroke output wedge that can perform the keystroke emulation function of a standard hardware wedge, but can also provide the user a wide variety of sophisticated natural language messages without having to create custom software or modify a standard keyboard-based software application that is designed to receive keystroke data inputs.

SUMMARY

The present invention is a keystroke output wedge (also referred to hereinafter as a "wedge"), implemented in software or firmware, that provides natural-language messages to a user. The wedge provides the data conversion function of a typical hardware wedge, namely, the translation of bar code input data into keystroke output data for use in a typical keyboard-based application program. But, it can also provide sophisticated natural language feedback to the user in audible or visual form. For example, the keyboard output wedge may return the confirmation message "VALID SCAN, SCAN PART NUMBER NEXT" when the user scans a particular bar code.

DETAILED DESCRIPTION

Overview

The present invention is a keystroke output wedge (also referred to hereinafter for brevity as a "wedge"), implemented in software or firmware, that provides natural-language messages to a user. The wedge provides the data translation function of a typical hardware wedge, namely, the translation of bar code input data into keystroke output data for use in a typical keyboard-based application program. But, it can also provide sophisticated natural language feedback to the user in audible or visual form. For example, the wedge may return an audible or visible confirmation message "VALID SCAN, SCAN PART NUMBER NEXT" when the user scans a particular bar code.

The invention allows a user to work with a scanner to provide multiple kinds of input (e.g., numbers, letters, or different formats of numbers or letters) to a keyboard-based application program without constantly referring to information on a computer display for guidance or prompting. For example, the user can work with a remote wireless scanner while wearing wireless headphones to receive natural language messages sent by the wedge. Or, the user can view a text message on a display incorporated into the scanner he or she is using.

The wedge can determine a variety of states of the keyboard-based application program or computer operating system (O.S.) and convey a message in natural language to a user as a function of the state of the application or the O.S. An example is the case of a product shipping application. Such an application may require the entry of several data fields to complete the shipping transaction. The fields may be "PURCHASE ORDER NUMBER," "PART NUMBER," and "QUANTITY." The wedge program monitors the readiness of the application for a particular data type through operating system queries. At the appropriate time, the wedge will convey a prompt message, which solicits an action from the user, such as "SCAN PART NUMBER." This may be followed by a combined feedback and prompt message such as, "VALID SCAN, SCAN QUANTITY."

Alternatively, the user may desire to switch applications. This could be done manually (by selecting a new window to come to the front of a display screen) or by scanning a command code to bring a new window to front, thereby activating a new transaction, whereupon the wedge might return, "INVENTORY TRANSACTION READY, SCAN PARTS BIN NUMBER," to confirm to the user that the desired application is running and to prompt for, or solicit, entry of a specific type of information. Yet another example is the case where the scan is valid but the host application is not responding. The message might contain confirmation and status messages such as: "VALID SCAN, APPLICATION NOT RESPONDING, CHECK HOST COMPUTER."

Figure 1:
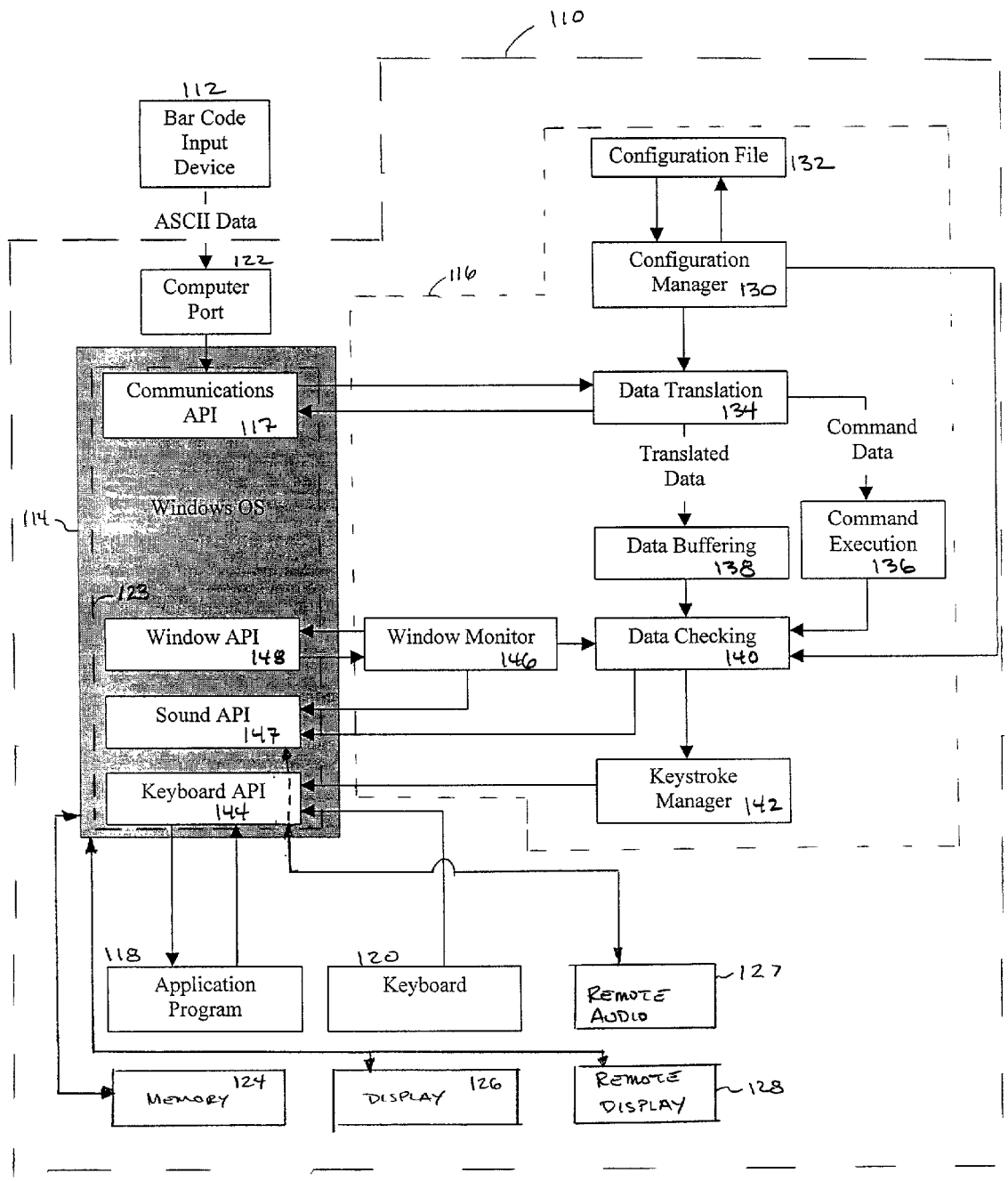
FIG. 1 is an schematic depiction of an embodiment of the present invention including a computer, a scanner and peripheral devices.

Referring now to FIG. 1, the schematic diagram depicts a computer 110 and a bar code input device 112, (scanner) configured to implement the method of the present invention. The computer 110 includes an operating system (OS) 114, a keystroke output wedge software program 116, a keyboard-based application program 118, a keyboard 120, a communications port 122, a memory 124 and a monitor or display 126 and, in some embodiments, a remote audio output 127 (speakers) and a remote display 128, such as an LED panel on a scanner.

The computer 110 may be of a typical desktop PC type, a laptop or a special purpose computer designed more specifically for portable data collection applications. The bar code input device may alternatively be any data input device that provides a data stream to the computer that is readily convertible to keystroke data, such as a scale or bar code scanner. For the purposes of this description the word "scanner" is intended to mean a device for scanning bar codes, or any other data input device. An example of a suitable scanner to use in the present invention is the Intermec 1551 laser scanner. The communications port may be an RS-232 serial port, a USB port, an infrared port, or other portal for communicating with the computer. The principle criterion is that the scanner 112 be capable of transmitting data to the communications port 122.

The present invention will be described in the context of the Microsoft Windows NT 4.0 operating system, but it is understood that other operating systems, such as LINUX and Apple's System 8.0 for example, are suitable for practicing the invention. Contained in the Windows OS 114 is a complete API 123 (Application Program Interface) allowing application programs to obtain and exchange information concerning the operating state of the computer. (For more information on this API, refer to Microsoft's Win32 Programmer's Reference, Volumes 1 through 5.) The memory 124 may be a typical hard drive, a floppy disk, a CD or DVD, or other computer readable media for storing applications programs, the O.S. or other computer program code.

Configuration Manager

Before the process of scanning begins, the user must define how he will use the scanner to complete a data collection process or "transaction." This is done using the Configuration Manager module 130 which is part of the wedge 116 indicated in FIG. 1.

Figure 2:
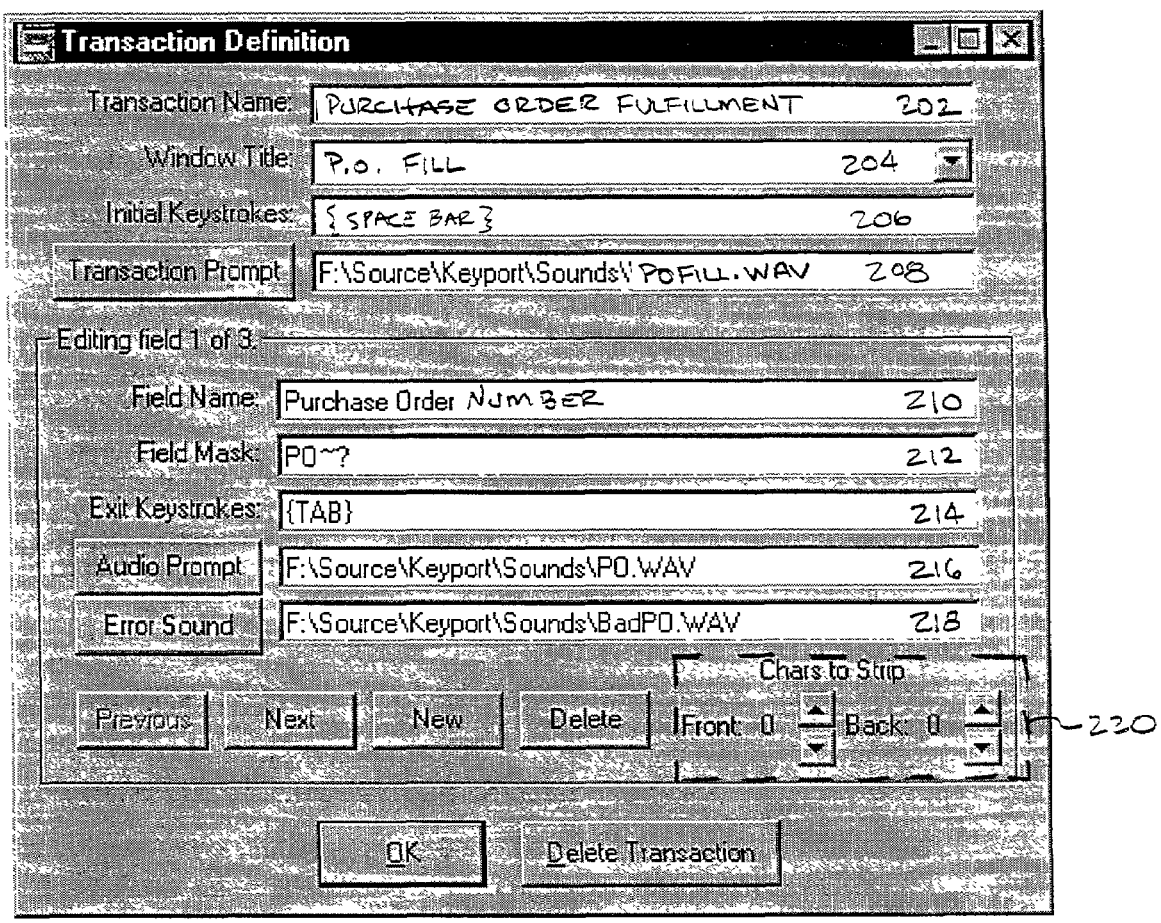
FIG. 2 is a depiction of the transaction definition window used to define various data field parameters and natural language messages.

A particular set of data is required to complete a transaction in the application program 118. For instance, to complete a Purchase Order fulfillment transaction, a Purchase Order number may need to be entered in a field in the application program 118 along with other information such as Part Numbers and Quantities. FIG. 2 illustrates a Transaction Definition window 200, presented by the Configuration Manager module 130. The Transaction Definition window is used to setup the various parameters relating to different data fields to be collected by the user and the types of messages that may be transmitted to the user depending on variables such as the state of the application program or the quality of the scan.

The Transaction Definition includes the following fields and controls. A descriptive Transaction Name field 202, in this case "PURCHASE ORDER FULFILLMENT." The next field is the Window Title field 204, which identifies the name of the window in the keyboard-based application program into which the transaction information is entered. This is followed an Initial Keystrokes field 206, which defines the initial keystrokes to be entered before the first data field is filled in, such as a leading {SPACE BAR} entry. Next is a Transaction Prompt field 208, which defines the message to be conveyed to the user. In this case, a computer audio WAV file called "POfill.wav" is transmitted to the remote audio output 127 (speakers) indicating that the transaction is active. Alternatively, a text file could be transmitted to remote display 128 which may be a LCD screen for example a handheld wireless scanner.

The next section of the Transaction Definition window 200 is used to define the various data items or fields in the application program that are required to complete the transaction, their associated messages and other parameters. A Field Name field 210 identifies the name of the field in the application program, (e.g., "PURCHASE ORDER NUMBER." A Field Mask field 212 is next. The field mask value in the Field Mask field 212 is used to error-check the data supplied for that field identified in the Field Name field 210. Next is the Exit Keystrokes field 214. The field defines the keystrokes to be entered after the data field is filled in. For example, once the "PURCHASE ORDER NUMBER" field is filled in, a "{TAB}" keystroke will be transmitted to the application program that will cause the next field in the application program to be set to receive data, for instance, a "PART NUMBER" field. The Audio Prompt field 216 contains the identifies the WAV file to be run when the application program is ready to gather that data for that field defined in Field Name 210. This is followed by an Error Message field 218 which defines the WAV file to be run if the input data does not pass the error checking (i.e., does not fit the field mask value).

Next are the Character Stripping Controls 220 which establish the number of characters that need to be stripped from the front or back of the bar code data before the data is entered into the application. As an example, a company may have part number bar codes on all inventory that consists of the letters "PN" followed by the part number. These two letters allow the bar code to be error checked to make sure it starts with "PN," but the letters "PN" must be stripped off before the part number is sent as keystrokes to the PC application. Depicted, but not described, are additional controls for setting up additional fields, etc. Now referring to FIG. 1, the Configuration Manager 130 writes all the information out to a Configuration File 132. The Configuration File 132 is loaded into the Configuration Manager 130 whenever the wedge program 116 is run.

Bar Code Input Device

When a bar code is scanned, the bar code is decoded by the scanner and a carriage return (ASCII value 13) is appended. The result is passed as ASCII data to the communications port 122 where it is received and stored by Windows. Windows makes this data available to the wedge program 116 through a Windows Communications API 117.

Data Translation and Buffering

Certain bytes of data that are received in the serial port may not correspond to keystrokes. For instance, the scanner is configured to append special characters, such as a carriage return, to the end of each scan. This is to be used to indicate that a scan is complete, and any further data will be coming from the next scan. The receiving application may be programmed to receive an "ENTER" keystroke following the input of data, or a "TAB" keystroke, or no keystroke at all. In addition, the wedge might be required to drop certain characters, pass multiple keystrokes to the application, or execute a command when a single character is received. The purpose of the Data Translation module 134 is to translate the serial input into the desired application program input and also sort out the commands and pass them to the Command Execution module 136. At approximately the same time, the remaining data is passed to the Data Buffering module 138 for storage until the Data Checking module 140 is ready for the data. The Data Translation module 134 uses an MS COM object to interface with the Windows Communications API 117. The Data Translation module 134 is informed by an O.S. event that data is available. The data is retrieved using the input "method" (in this context "method" is a programming term associated with MS COM,) of the MS COM object. (For general reference regarding MS COM, see Microsoft Visual Basic 6.0 Controls Reference.)

Command Execution

When the Command Execution module 136 is informed by the Data Translation module 134 that a carriage return character (ASCII value 13) has been received, the Command Execution module 136 knows that a scan has ended and informs the Data Checking module 140 that the Data Checking module 140 needs to perform error checking on the data being stored in the Data Buffering module 138. Other commands can be executed by setting the Data Translation module to look for specified command characters in the input data stream and passing these commands to the Command Execution module. Other commands can be defined, such as one that brings a new window to the front, requests a repeat of a previous prompt, or runs an application.

Data Checking

Figure 3:
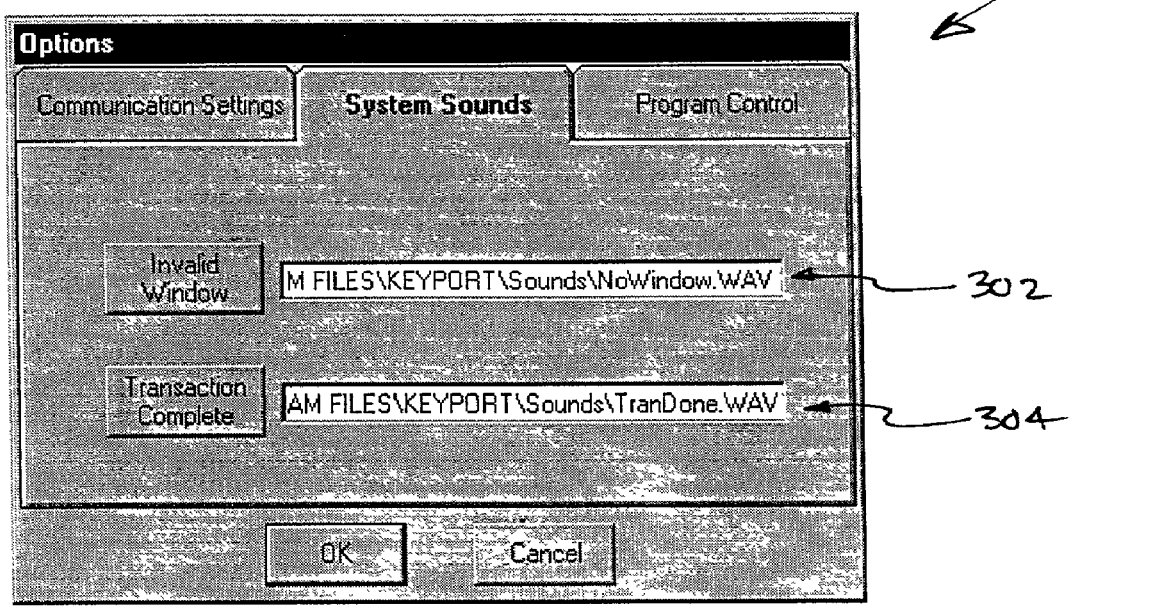
FIG. 3 depicts a definition window for wedge options used to define natural language message file locations.

The Data Checking module 140 keeps track of which transaction (e.g., PURCHASE ORDER FULFILLMENT) is being worked on, and for which data field (e.g., PURCHASE ORDER NUMBER) data is being gathered. If the currently active window on the host computer 110 (see Window Monitor, below) is not a window intended to collect transaction data, an audible natural language message is played informing the user (e.g., "INVALID WINDOW"). As shown in FIG. 3, a wedge options window 300 provides a means for defining the WAV files to be played in the instances of an invalid window 302 or a completed transaction 304.

Once the currently active window is the correct window for the current transaction data collection activity, the Data Checking module 140 uses the field mask value (see Field Mask 212 above) to check the data for accuracy. If the scanned data does not fit the field mask value, the Data Checking module 140 causes an audible natural language message to be transmitted to the user (e.g., "INVALID PURCHASE ORDER NUMBER"). This message informs the user that the scan was not acceptable, and gives positive feedback to the user regarding what would be acceptable. The audible natural language message is communicated to the user by calling the Windows Sound API 147 with the "sndPlaySound" function (ref. Microsoft Win32 Programmer's Reference). The message is identified in the Error Message field 218 discussed above in Configuration Manager section.

Field Mask

The field mask value of the Field Mask 212 is used to check the incoming data to ensure that the proper bar codes are being scanned. The field mask may include characters with special meanings. Examples of special characters that may be used in the field mask and their meanings are shown in Table 1.

TABLE 1

| | |
|---|---|
| @ | This character matches upper- and lower-case a–z only. |
| # | This character equals the numeric digits from 0–9. |
| ? | This character will accept any printable character. |
| ~ | This is a prefix that indicates that any number of the following characters are acceptable (even zero). |

All other characters in the mask are treated literally. For example, assume the user wants to scan a part number for a given field and all the part numbers begin with the letters "PN," which is followed by one or more digits (e.g. "PN1234"). If the field mask value is set to "PN", only scans that are exactly "PN" will be accepted hence, "PN1234" wont be accepted because it contains additional characters, namely, "1234." But, if the field mask value is set to "PN~?", then, per the rules established in Table 1, the scan will be accepted as valid because it starts with "PN" and the following string of characters "1234" are printable.

Keystroke Manager

The Keystroke Manager module 142 is responsible for transmitting the keystroke data to the windows application. The data is transmitted by repeatedly calling the Windows Keyboard API 144 using the "keybd_event" function.

Window Monitor

The purpose of the Window Monitor module 146 is to detect which transaction is represented by the foremost window. (In a keyboard environment, the foremost window, alternatively the currently active window, is the one to which keystrokes will be sent. In most computer systems, the currently active window can be viewed on the monitor. If there are multiple open windows, the currently active window can usually be viewed as the topmost or foremost window, or it may be differentiated by a color scheme that contrasts with other open, but not active, windows.) The Window Monitor module 146 performs its function by monitoring the title of the foremost window and comparing the title to the values entered in the Window Title field 204 of the Transaction Definition 200. The Window Monitor module 146 repeatedly queries (e.g., 20 times per second) the Windows API 148 using the functions "GetForegroundWindow" and "GetWindowText" (ref. Microsoft Win32 Programmer's Reference) to determine which window is foremost and the title of that window. If a new window is brought to the forefront, the Window Monitor module 146 consults the transaction definitions in the Configuration Manager 130 to find a transaction with the same title as new foremost window. If no transaction exists for the new window, the Data Checking module 140 is informed. If any scan is received at that time, the Invalid Window WAV file 302 is played. If a transaction definition exists that matches the window title, values are set that inform the Data Checking module 140 which transaction the application program is ready to process. A natural language message is then transmitted to the user (e.g., "PURCHASE ORDER FULLFILLMENT TRANSACTION READY, SCAN PURCHASE ORDER NUMBER") informing the user of the status of or feedback regarding the application program and prompting the user to provide data.

As indicated by the foregoing description, many alternative configurations of software are possible to create embodiments of the invention. Consequently, the invention should not be limited by the foregoing description and should be viewed as broadly as the following claims.

We claim:

1. A method for presenting a natural language message to a user from a keystroke output wedge, the method comprising:
   a) querying a Windows-type operating system for information by transmitting to a Windows API a query for information from a keystroke output wedge;
   b) receiving in the keystroke output wedge information from the Windows-type operating system in response to the query; and
   c) providing to a user from the keystroke output wedge a natural language message, where the natural language message is a function of the information from the operating system.

2. The method of claim 1 wherein the information relates to a Windows-type application program designed to receive keystroke input.

3. The method of claim 1 wherein the natural language message is a prompt soliciting the user to provide input data.

4. The method of claim 1 wherein the natural language message is feedback provided in response to input data received from the user.

5. The method of claim 1 wherein the natural language message is a status message provided to the user in response to a pre-programmed inquiry from the keystroke output wedge to the operating system.

6. The method of claim 1 further comprising receiving in a keystroke output wedge input data from a data input device.

7. The method of claim 1 wherein the data input device is a bar code data input device.

8. The method of claim 1 where the step of transmitting to a Windows API further includes transmitting a GetForegroundWindow function.

9. The method of claim 1 where the step of transmitting to a Windows API further includes transmitting a GetWindowText function.

10. The method of claim 1 where the step of providing to a user from the keystroke output wedge a natural language message further includes transmitting to a Windows API a sndPlaySound function.

11. The method of claim 1 wherein the natural language message is provided audibly.

12. The method of claim 1 wherein the natural language message is provided visually.

13. The method of claim 1 wherein the natural language message is provided at a pre-selected time.

14. A computer readable medium containing a computer program which, when run on a computer, causes the computer to perform the steps of:
   a) querying a Windows-type operating system for information by transmitting to a Windows API a query for information from a keystroke output wedge;
   b) receiving in the keystroke output wedge information from the Windows-type operating system in response to the query; and
   c) providing to a user from the keystroke output wedge a natural language message, where the natural language message is a function of the information from the operating system.

15. The computer readable medium of claim 14 where the medium is a tangible memory.

16. The computer readable medium of claim 14 where the medium is a data carrying electromagnetic signal.

17. The computer readable medium of claim 14 wherein the information relates to a Windows-type application program designed to receive keystroke input.

18. The computer readable medium of claim 14 wherein the natural language message is a prompt soliciting the user to provide input data.

19. The computer readable medium of claim 14 wherein the natural language message is feedback provided in response to input data received from the user.

20. The computer readable medium of claim 14 wherein the natural language message is a status message provided to the user in response to a pre-programmed inquiry from the keystroke output wedge to the operating system.

21. The computer readable medium of claim 14 further comprising receiving in a keystroke output wedge input data from a data input device.

22. The computer readable medium of claim 14 wherein the data input device is a bar code data input device.

23. The computer readable medium of claim 14 where the step of transmitting to a Windows API further includes transmitting a GetForegroundWindow function.

24. The computer readable medium of claim 14 where the step of transmitting to a Windows API further includes transmitting a GetWindowText function.

25. The computer readable medium of claim 14 where the step of providing to a user from the keystroke output wedge a natural language message further includes transmitting to a Windows API a sndPlaySound function.

* * * * *